US007224774B1

(12) United States Patent
Brown et al.

(10) Patent No.: US 7,224,774 B1
(45) Date of Patent: May 29, 2007

(54) REAL-TIME CALL CONTROL SYSTEM

(75) Inventors: Wendell Brown, Las Vegas, NV (US); William Clarence Hatcher, Menlo Park, CA (US); Oliver Renner Capio, Mountain View, CA (US); Mark Klein, Los Altos, CA (US)

(73) Assignee: AOL LLC, Dulles, VA (US)

( * ) Notice: Subject to any disclaimer, the term of this patent is extended or adjusted under 35 U.S.C. 154(b) by 352 days.

(21) Appl. No.: 09/815,819

(22) Filed: Mar. 23, 2001

(51) Int. Cl.
*H04M 11/00* (2006.01)
*H04M 1/64* (2006.01)
*G10L 15/00* (2006.01)

(52) U.S. Cl. .............................. 379/88.14; 379/88.17; 704/235

(58) Field of Classification Search ............. 379/88.11, 379/88.12, 88.13, 88.17, 215.01; 370/352, 370/88.11
See application file for complete search history.

(56) References Cited

U.S. PATENT DOCUMENTS

| 5,062,133 | A |   | 10/1991 | Melrose ........................ 379/94 |
| 5,327,486 | A | * | 7/1994  | Wolff et al. ............... 379/93.23 |
| 5,625,676 | A | * | 4/1997  | Greco et al. ............... 379/88.14 |
| 5,668,862 | A |   | 9/1997  | Bannister et al. ........... 379/201 |
| 5,805,587 | A | * | 9/1998  | Norris et al. ................ 370/352 |
| 5,809,128 | A | * | 9/1998  | McMullin ............... 379/215.01 |
| 5,946,386 | A |   | 8/1999  | Rogers et al. ............... 379/265 |
| 5,982,774 | A | * | 11/1999 | Foladare et al. ............. 370/401 |
| 6,031,896 | A |   | 2/2000  | Gardell et al. ........... 379/88.17 |
| 6,091,808 | A |   | 7/2000  | Wood et al. ................. 379/201 |
| 6,108,521 | A |   | 8/2000  | Foladare et al. ............ 455/31.3 |
| 6,173,250 | B1 | * | 1/2001  | Jong ............................. 704/3 |
| 6,219,413 | B1 | * | 4/2001  | Burg ...................... 379/215.01 |
| 6,304,636 | B1 | * | 10/2001 | Goldberg et al. ........ 379/88.14 |
| 6,333,973 | B1 | * | 12/2001 | Smith et al. ............. 379/88.12 |
| 6,339,754 | B1 | * | 1/2002  | Flanagan et al. .............. 704/2 |
| 6,404,860 | B1 | * | 6/2002  | Casellini .................. 379/88.17 |
| 6,459,913 | B2 | * | 10/2002 | Cloutier ...................... 455/567 |
| 6,580,790 | B1 | * | 6/2003  | Henry et al. ........... 379/201.01 |
| 6,618,704 | B2 | * | 9/2003  | Kanevsky et al. .......... 704/271 |
| 6,788,769 | B1 | * | 9/2004  | Waites ..................... 379/93.24 |

(Continued)

OTHER PUBLICATIONS

Harry Newton, Newton's Telecom Dictionary, CMP Books, 18th Edition, p. 614—"Real Time".*

*Primary Examiner*—Fan Tsang
*Assistant Examiner*—Joseph T Phan
(74) *Attorney, Agent, or Firm*—Michael A. Glenn; Glenn Patent Group (57) ABSTRACT

A system and method are provided for real-time call control. When a call is received at a telephone server for a service subscriber, the server identifies the subscriber and retrieves information that will allow the server to contact the subscriber via instant messaging. An instant message is sent to the subscriber, and includes any number of options for controlling or handling the call. The options may be presented as hyperlinks, or the selected option may be returned in another instant message. The subscriber selects an option and communicates it to the server, which effects the selected option. The server may establish an audio connection between the server and the subscriber's computer or communication device (to allow the parties to talk), may transfer the call to another number, play a message for the caller (which may be pre-recorded or recorded in real-time), record a voicemail (which the subscriber may screen), etc.

28 Claims, 4 Drawing Sheets

U.S. PATENT DOCUMENTS

| | | | |
|---|---|---|---|
| 7,058,036 B1 * | 6/2006 | Yu et al. | 370/335 |
| 7,130,401 B2 * | 10/2006 | Rampey et al. | 379/142.14 |
| 2002/0037074 A1 * | 3/2002 | Dowens et al. | 379/88.14 |
| 2002/0071539 A1 * | 6/2002 | Diament et al. | 379/202.01 |
| 2003/0039340 A1 * | 2/2003 | Deshpande et al. | 379/88.16 |
| 2004/0086100 A1 * | 5/2004 | Moore et al. | 379/201.01 |
| 2004/0186909 A1 * | 9/2004 | Greenwood | 709/227 |
| 2005/0021344 A1 * | 1/2005 | Davis et al. | 704/277 |

* cited by examiner

FIG. 3B

REAL-TIME CALL CONTROL SYSTEM

BACKGROUND

This invention relates to the fields of computer and communications. More particularly, a system and methods are provided for handling a telephone call in real-time.

When a telephone user or subscriber is not present when a call is received, there are generally few options for handling the call. The caller may be prompted to leave a voicemail message, the user's telephone line may be set to forward the call to another number, or the caller may simply hang up. Although the caller will likely be able to contact the user eventually, at the same or a different number, this will require additional calls or other action on the caller's part. It would be advantageous to enable timely contact with the user (i.e., the called party) in order to inform him or her of the call and allow the user to decide how to handle the call—whether to answer it, forward or transfer it to another number, take a voicemail message, respond with a single message, etc.

In one solution to the need for real-time call control, a presence server is configured to track the location of, or means of contacting, a user. The user employs a computer that communicates with the presence server and provides its location (e.g., network address). However, in this solution the user's computer must be configured with custom or specialized software for interfacing with the user and presence server and enabling call control. Thus, the specialized software must be installed on each of the user's computers and must be upgraded in order to provide different or additional functionality. And, the software only enables the user's computer to perform call control operations through the presence server.

SUMMARY

In one embodiment of the invention a system and methods are provided for enabling real-time call control without the use of specialized software. Existing communication methods are used to enable the real-time control, such as any of several varieties of instant messaging.

In this embodiment, a call is received at a call server for a subscriber. The subscriber and/or caller are identified (e.g., by the original called number and caller ID fields) and a subscriber profile is consulted to determine what call handling options to offer the subscriber and how to offer them. Thus, the system may retrieve the subscriber's user names for one or more instant messaging systems and send one or more instant messages to notify the subscriber of the call and offer any number of call handling options. Illustrative call handling options include answering the call, taking a voicemail message (with or without screening the message), transferring or forwarding the call, playing a message for the caller, etc. If the subscriber does not respond in a predetermined period of time the call server may apply a default option.

If an instant messaging system that is used is hypertext-capable, the options may be presented as hyperlinks. In this case the subscriber selects a hyperlink option, is connected to the call server and may provide any additional information that is needed (e.g., a forward-to number, a message to play for the caller). Alternatively, the subscriber may respond with an instant message identifying his or her selected call handling option.

Upon receipt of the selected option, the call server takes the necessary action to handle the call: establish an audio connection with the user (e.g., through the instant messaging system, via voice over IP), connecting the caller to a voicemail module, transfer the call to another number, retrieve a message and play it for the caller, etc. Text/speech conversion may be performed as necessary, to convert a textual message specified by the subscriber into audio form for the caller, if the subscriber's computer/communication device is not equipped with both a microphone and speaker, etc.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) are well known and are omitted for the sake of clarity.

It should also be understood that the techniques of the present invention might be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

In one embodiment of the invention, a system and methods are provided for enabling real-time control of a telephone call. In this embodiment, a call made to a subscriber's telephone (e.g., home, work or mobile telephone) is forwarded to a call control server when there is no answer. In another embodiment, the subscriber's telephone service may be configured to forward all or a subset of all calls to the call control server (e.g., all calls from a specified number or area code).

The call control server is configured with one or more types of instant messaging systems or services, such as those provided by AOL (America OnLine), Microsoft, Yahoo, or some other provider. When the call is received at the call control server and the server identifies the called subscriber (e.g., by OCN—Original Called Number), the call control server sends an instant messaging message to the subscriber's device (e.g., computer, two-way pager, smart telephone), which provides the subscriber with a number of options for handling the call. The options may depend upon the type of device the user is operating and/or the type of instant messaging with which the user and the call control server communicate, and may include any of the following as well as others: answer the call, forward or transfer the call to another number, take a message, respond to the caller with a message (which may be pre-configured or configured when the user is notified of the call), etc. Default methods may be specified for handling calls when a subscriber is not available or does not respond.

When the subscriber selects a method of handling the call, a response is sent to the call control server and the selected method is executed. In different embodiments of the invention, the response may be sent to the call control server via a return instant messaging message and/or directly to the server via a network (e.g., Internet) or other communication connection. In particular, if the subscriber uses an instant messaging system that supports hyperlinks, one or more of the options provided to the subscriber via instant messaging may comprise hyperlinks that initiate http (HyperText Transfer Protocol) connections to the call control server, and the subscriber may choose to respond via one of the hyperlinks and/or via a return instant message.

If the subscriber chooses to answer the call and the subscriber's device is equipped for audio (e.g., with a microphone and/or speaker), the call may be converted at the call control server into a VOIP (Voice Over Internet Protocol) connection. Text-to-speech and/or speech-to-text software may be employed if the subscriber's device does not have both a microphone and speaker. In this embodiment, if the subscriber chooses to respond to the call with a message, the message may be selected from a number of pre-recorded messages or may be recorded at the time of the call in the subscriber's voice and then played for the caller. Alternatively, a textual message selected or composed by the subscriber may be converted to audio and played for the caller.

In another embodiment of the invention, in which the call control server and the subscriber's device communicate only via instant messaging (e.g., an instant messaging system that does not support hypertext), answering the call may not be an option. Or, text/speech conversion software may be used to allow the caller and subscriber to communicate.

In a present embodiment of the invention, the call control server may be configured to keep track of how to contact the subscriber by storing his or her usernames, screen names or other identifiers for the instant messaging service(s) he or she uses. Thus, the call control server may then send instant messages (e.g., one message for each type of instant messaging for which the subscriber's device is configured) to the subscriber when a call is received. If the subscriber does not respond, the system may assume that he or she is not online and therefore implement a default call control option.

Figure 1:
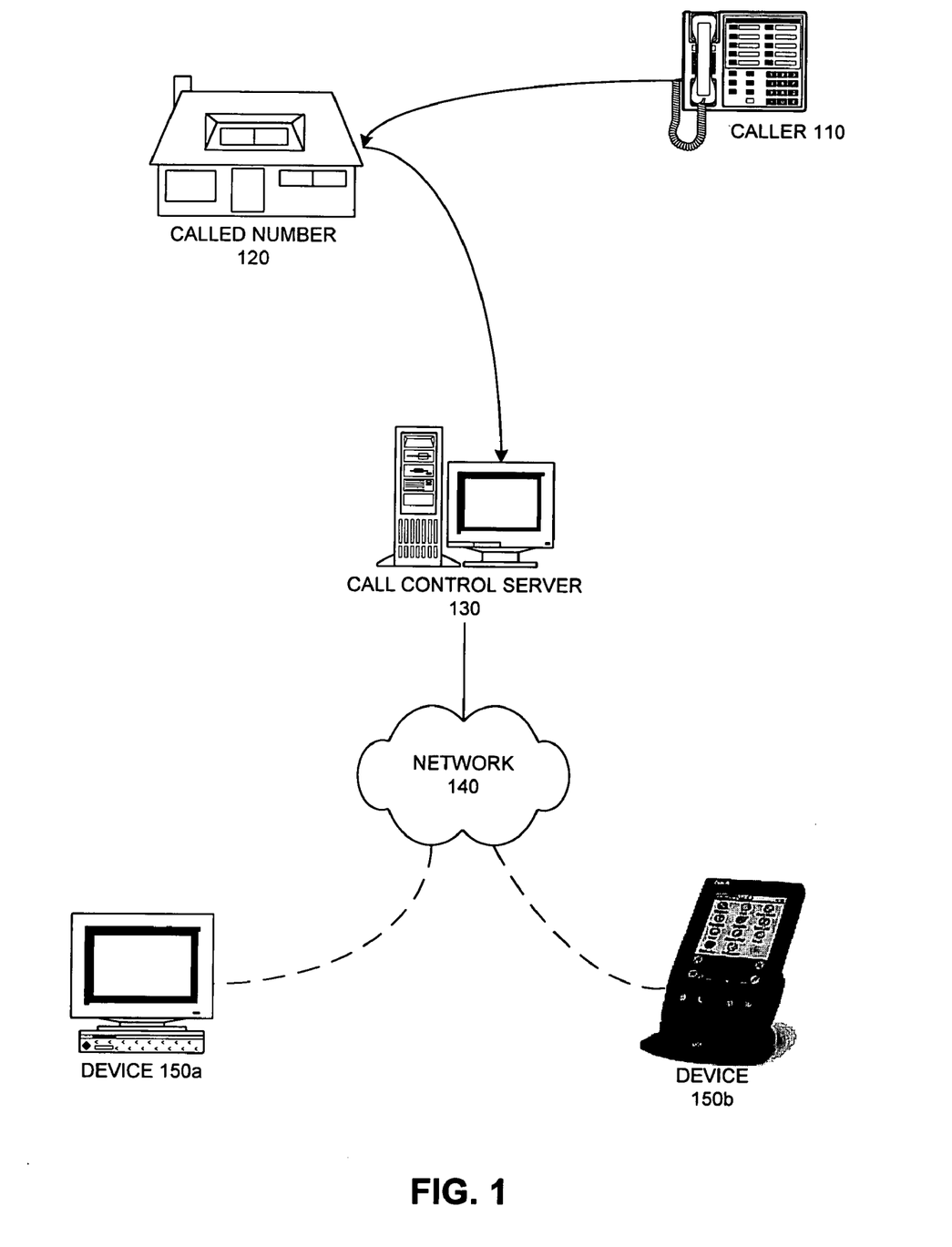
FIG. 1 is a block diagram depicting a real-time call control system in accordance with an embodiment of the present invention.

FIG. 1 depicts an illustrative embodiment of a real-time call control system according to one embodiment of the invention. In the illustrated embodiment, caller 110 calls a subscriber from any type of telephonically equipped device.

The call is initially received at called number 120, which may be the subscriber's house, office, mobile telephone, etc.

Because the subscriber is not present at the time of the call, his or her telephone line is busy, or because of the configuration of the telephone service for the called number (e.g., automatic forwarding), the call is forwarded to call control server 130. Illustratively, call control server 130 may be just one of multiple call control servers configured to enable real-time call control. Calls may be distributed among multiple call control servers for load balancing purposes, to apply different levels of service for different subscribers, etc. For example, depending on the level of service requested by a particular subscriber, he or she may be offered different subsets of the available call control options, additional storage space for storing voicemail messages, the ability to record audio messages to be played for callers, etc.

At call control server 130, the system identifies the subscriber that is being called, which may be accomplished by looking up the OCN (Original Called Number), which is received with the forwarded call, in a database of subscribers. The database may also identify the options that may be provided to the subscriber, a default option to be applied if he cannot be contacted, the type or version of instant messaging to be used to contact him, the subscriber's username, screen name or other instant messaging user identifier, etc. Further, call control server 130 may also identify the caller (e.g., via caller ID). The call control server may, for example, look up the caller's telephone number in a telephone directory, a reverse-lookup directory service (e.g., such as that offered at http://www.infospace.com), or some other data collection (e.g., the called subscriber's address book). Depending on whether the caller's name or other identifier (besides the caller ID number) can be found, the caller may be identified to the subscriber (in the initial instant message) with any suitable identifying information.

Call control server 130 then initiates an instant message to the subscriber via network 140 or other communication connection. Network 140 may comprise the Internet or some other public or private network coupled to the call control server and the subscriber's device 150 (e.g., computer 150*a*, hand-held computer/communication device 150*b*). Illustratively, the initial instant message informs the subscriber that a call has been received for him, indicates who the call is from (e.g., by number and/or name), and offers any number of options for handling the call. Call control server 130 may initiate more than one message (sequentially or in parallel) if, for example, the subscriber uses more than one type of instant messaging, more than one instant messaging user identifier, more than one device (i.e., having more than one network address), etc. If the subscriber cannot be contacted within a pre-determined period of time (e.g., the instant messages are rejected, the subscriber does not respond), the call control server may abort the call control process and apply a default call control option (e.g., take a voicemail message).

Depending on the type or version of instant messaging used, the initial message may present different call control options (i.e., those that are compatible with the instant messaging system being used), and the options may take the form of hyperlinks that can be selected by clicking on the desired option. If the instant messaging system that is employed for the initial message does not support hypertext, then the initial message may prompt the subscriber to respond to the initial message with a number or letter corresponding to the desired option. In this case the response may be sent back to call control server 130 via a return instant message. In either case, however, the response that is initiated by the subscriber is configured to identify the responding subscriber (e.g., by instant messaging username, network address, an identifier of the initial message sent to the subscriber, an identifier of the channel on which the call is received) and the selected call control option.

When using a hypertext-capable instant messaging system, selecting the desired call control option will initiate a connection between subscriber device 150 and call control server 130. This may involve opening or directing a web browser or other suitable interface to the call control server. A selected hyperlink may include key/value pairs to send information (e.g., subscriber identity, selected option, identifier of call) to the server. The call control server may include a web server for receiving http connections from subscribers or may be coupled to a web server that receives the subscribers' connections. Call control server 130 may also include an IVR (Interactive Voice Response device), a text/speech converter, and/or any other equipment useful in handling a call as described herein.

In one embodiment of the invention, if the process of contacting the subscriber, receiving a call control option and implementing the option takes more than a threshold amount of time (e.g., thirty seconds), or if the process is expected to take a threshold amount of time, a recording or other message may be played for the caller to let him or her know that the subscriber is being located, is being informed of the call, etc.

As described above, the manner in which the subscriber's selected call control option is identified and acted on may depend upon whether the instant messaging system used to contact the subscriber is hypertext-capable. If the instant messaging system is hypertext-capable, then an HTTP connection to the call control server (or web server) may be opened for the subscriber, thereby allowing further information/control to be provided through a web or network interface (e.g., select or record in real-time a message to play for the caller, communicate with the caller via a text-to-speech interface, specify in real-time a number to forward the call to). When the subscriber responds from a device (e.g., a mobile telephone) or through an instant messaging system that does not offer hyperlinks, available call control options may be limited to those that require only minimal subscriber input (e.g., take a voicemail message, play a pre-configured message, transfer the call to a specified number).

Figure 2:
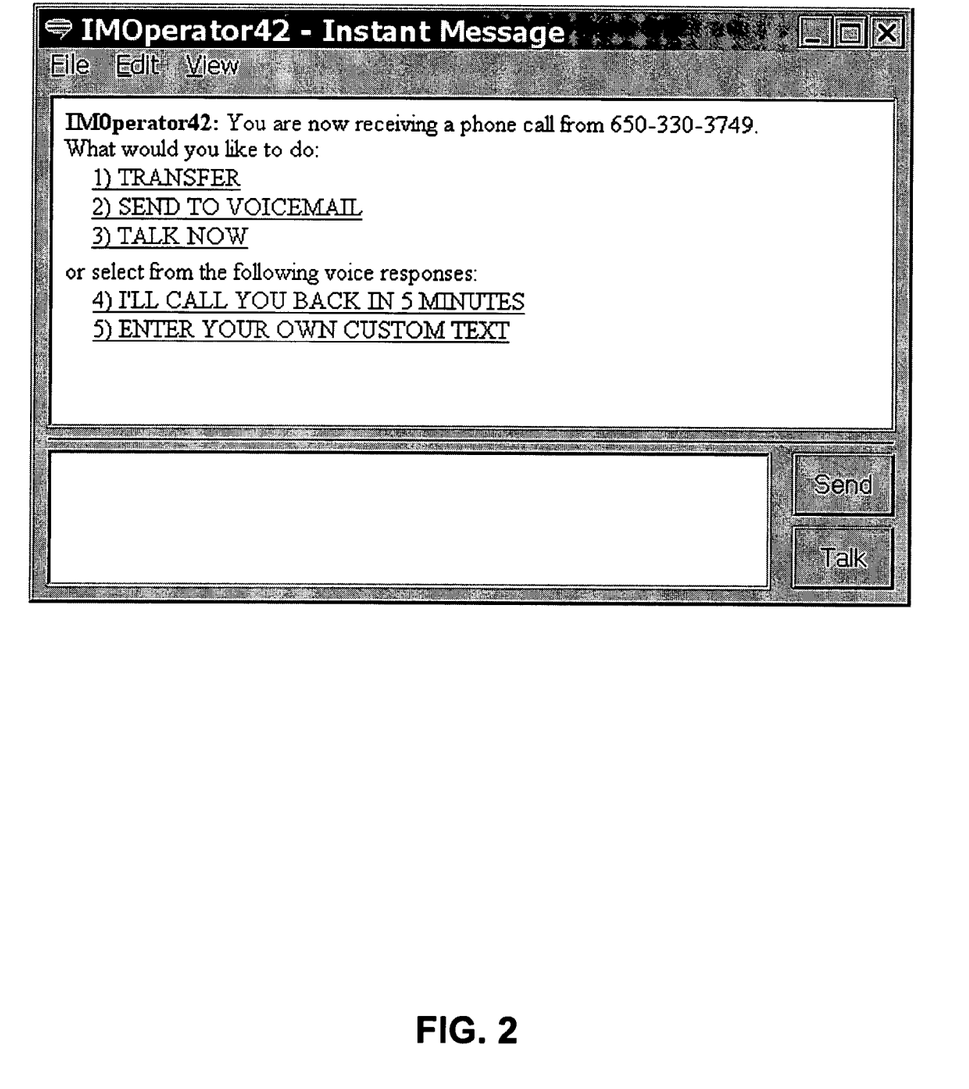
FIG. 2 depicts an illustrative instant message for notifying a subscriber of the receipt of a call, in accordance with an embodiment of the invention.

FIG. 2 illustrates one possible instant message interface that may be used to notify a subscriber of a telephone call and elicit a call control option.

If the subscriber selects an option to forward or transfer the call (e.g., the "TRANSFER" option in FIG. 2), call control server 130 switches the call to the specified number (which may be pre-selected or specified by the subscriber when selecting the option). The initial instant message may include multiple transfer options (e.g., one for each forward-to telephone number known to the system).

If the subscriber selects an option to record a message from the caller (e.g., the "VOICEMAIL" option in FIG. 2), call control server 130 connects the caller to a voicemail system, which may be part of the call control server or may be coupled to it. In one alternative embodiment of the invention, the recorded message may be forwarded to the subscriber (e.g., as an audio file or as a converted speech-to-text message).

If the subscriber chooses an option to play a message or response for the caller (e.g., the "voice response" options in FIG. 2), the selected message may have been pre-recorded or may be recorded or entered textually by the subscriber when notified of the call. Call control server 130 may thus include an IVR (Interactive Voice Response device). If the instant messaging system is not hypertext-capable, the subscriber may be limited to identifying a pre-configured message, which may or may not be recorded in the subscriber's voice. The initial instant message may thus identify a number of pre-configured messages, from which the subscriber selects an appropriate choice. If the instant messaging system is hypertext-capable, then the user may be able to record a message in real-time. Further, the subscriber may be provided with a relatively short message from the caller (e.g., a subject of the call) before the subscriber selects or records a response. In different embodiments of the invention, a real-time response from the subscriber may be stored in audio or text. If text, it may then be converted to audio and played for the caller.

As described above, in one embodiment of the invention the subscriber may choose to accept the call from the caller (e.g., the "TALK NOW" option in FIG. 2). Illustratively, if the instant messaging system offers VOIP service, the call control system may bridge the caller into a VOIP instant messaging connection at the call control server. Otherwise, the call control server is configured to establish a VOIP connection to the subscriber's device and bridge the caller into this connection. Yet further, if subscriber device 150 is not equipped with a microphone or speaker, the call control server and/or the subscriber's device may be configured to employ text/speech conversion to allow the caller and subscriber to communicate.

In an embodiment of the invention in which subscriber device 150 is equipped with a speaker but no microphone, the subscriber may have an option to send a custom (e.g., real-time) message to the caller. The subscriber thus enters the text of his message, which is relayed to the call control server. The call control server then converts the message to audio and plays it for the caller. In one implementation of this embodiment, a VOIP connection is established between the call control server and the subscriber device (e.g., so that the caller's voice can be heard at the device) and, when the converted text-to-speech message is played for the caller (e.g., by playing it over the VOIP connection), the subscriber may also hear it.

Figure 3A:
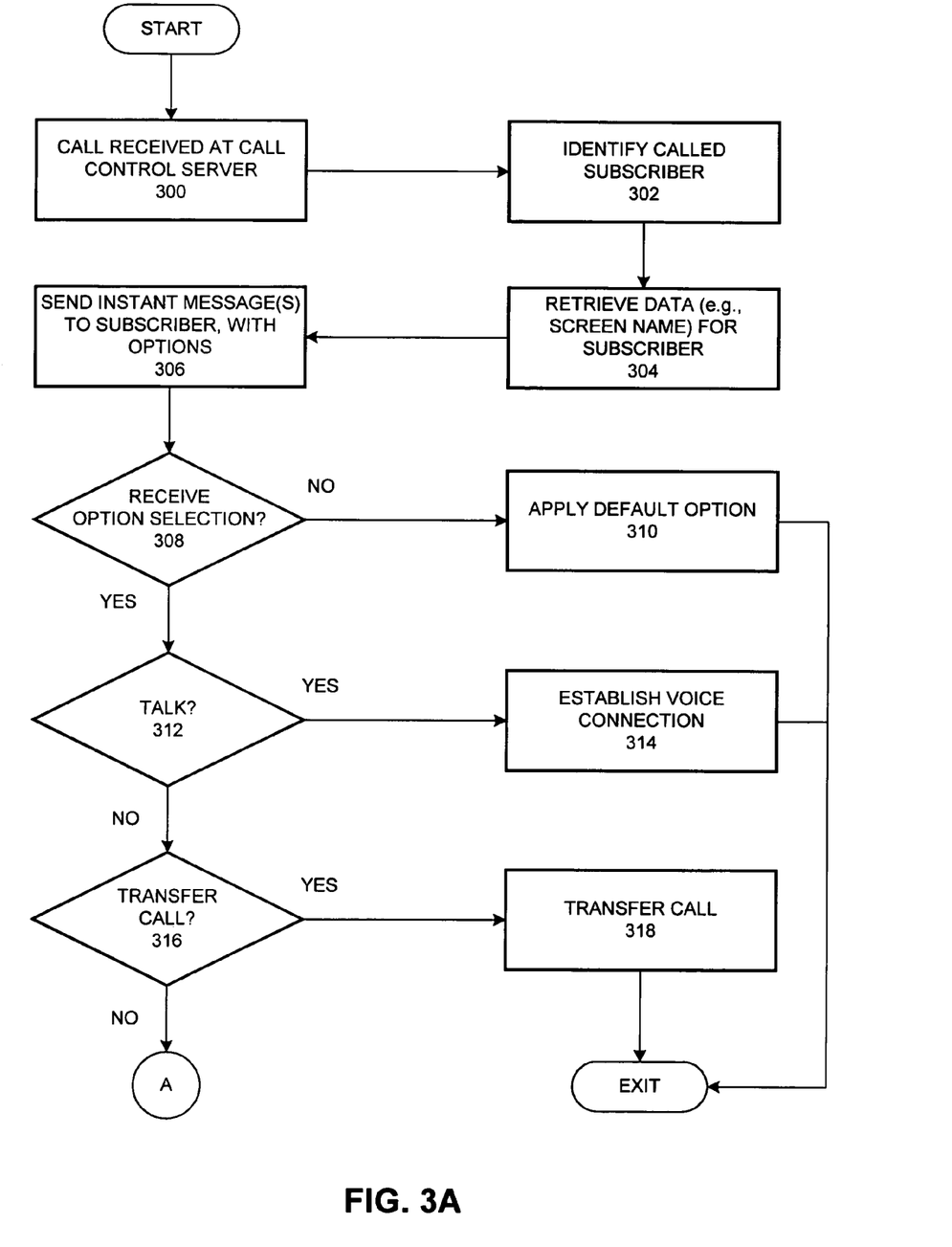
FIGS. 3A–B comprise a flowchart illustrating one method of providing real-time call control in accordance with an embodiment of the invention.
Figure 3B:
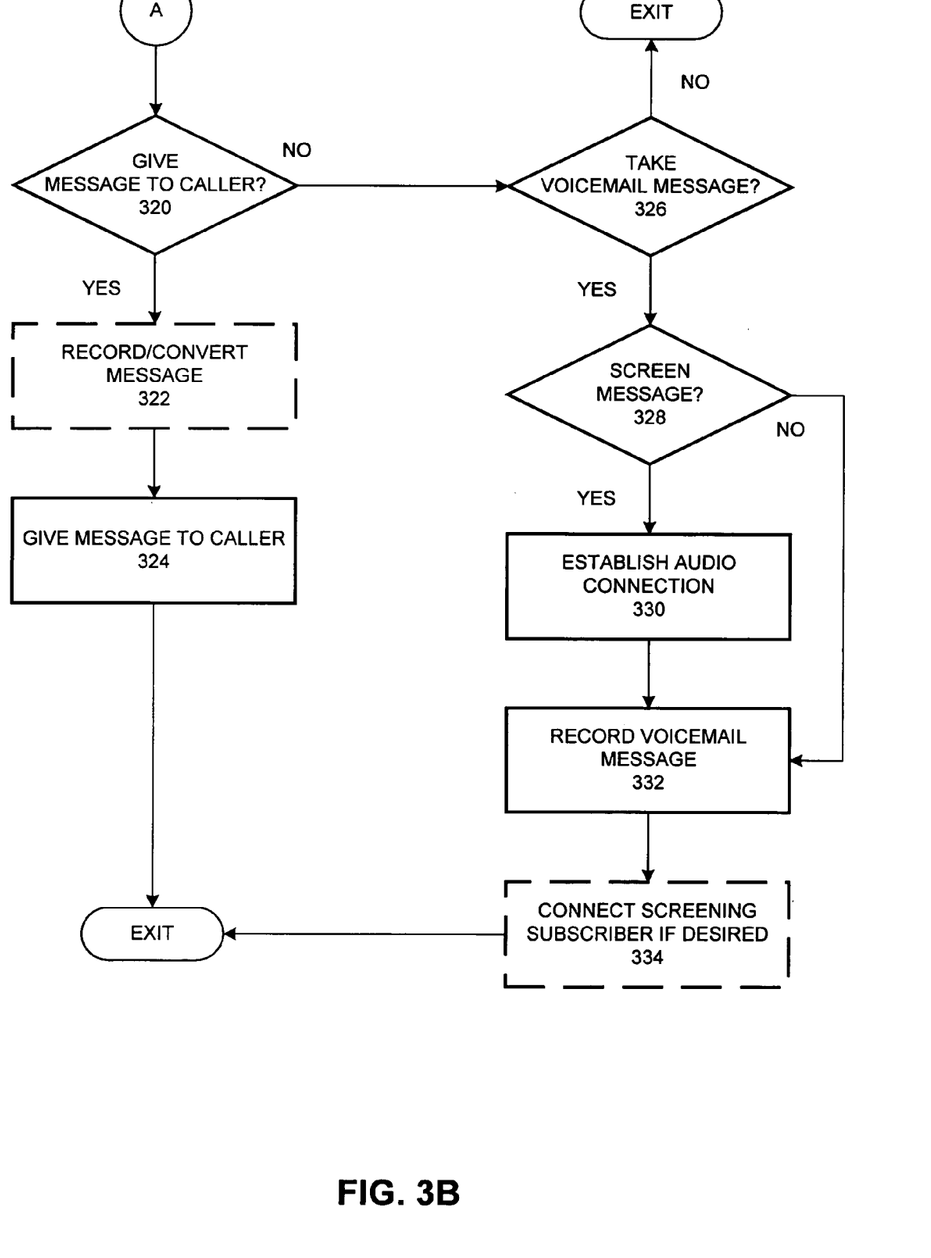

In another embodiment of the invention, a subscriber may be offered the option of screening a call (e.g., while the caller leaves a voicemail message). If this option is selected, the caller is connected to a voicemail module or system (e.g., an IVR) and a VOoIP connection is established between the call control server (or IVR) and the subscriber's device. As the caller records his or her message, the message is also played on the device for the subscriber to hear. If the device is not equipped with a speaker, speech-to-text conversion may be applied to provide the message to the subscriber. The subscriber may or may not be provided with the opportunity to break into the call while the caller's message is being recorded FIG. 3 illustrates a method of providing real-time call control according to one embodiment of the invention. In this embodiment, the instant messaging system used to notify a subscriber of an incoming call is hypertext-enabled, which may allow the subscriber to be provided with more call control options than may be offered via a non-hypertext-enabled instant messaging system.

In the embodiment of FIG. 3, a call to a subscriber is received at a call control server in state 300. The call may have been forwarded to the call control server from a residential, office, mobile or other telephone of the subscriber. Or, the caller may have dialed another number that is associated with the subscriber but which is answered by the call control server. For example, a subscriber may subscribe to a call control service that allows callers to dial a central number that the call control server answers for the subscriber.

In state 302, the call control server identifies the subscriber. Illustratively, this may be done by examining the OCN (Original Called Number) received with the call.

In state 304 the server retrieves necessary data concerning the subscriber and/or caller. This information may identify the type(s) and/or version(s) of instant messaging used by the subscriber, screen names or user names for the subscriber, network or other addresses associated with the subscriber's computer or communication device, the caller's name, etc. The subscriber's device may be configured such that, when the device is online, it connects to notifies the call control server of its address.

In state 306 the call control server sends an initial instant message (e.g., a message sent through a selected instant messaging system) to the subscriber's device. The initial instant message includes any number of options for controlling or handling the call. In this embodiment, the instant messaging service used to deliver the message is hypertext-capable, and so the options are presented as hyperlinks. More than one initial instant message may be sent (e.g., to different subscriber devices, different user/screen names, through different instant messaging systems).

In state 308 the system determines whether a response (e.g., an option selection) is received within a threshold period of time. If not, the system applies a default control option in state 310 and then exits. Otherwise, if an option selection is received, the call control server (and/or a web server) that receives the selection, or another system module, will take the necessary action to handle the call as directed.

In state 312, if the selected option is to talk with the caller, the call control server establishes an audio (e.g., voice over IP) connection with the subscriber's device and interconnects the caller in state 314. If the subscriber's device is not capable of two-way audio, text/speech conversion software may be executed as necessary. After state 314, the illustrated method ends. If the selected option was to do something other than answer the call, the method proceeds to state 316.

In state 316, the system determines whether the subscriber has requested the server to transfer the call. If not, the illustrated procedure advances to state 320. If the transfer option was selected, the system transfers the call to a pre-specified number or a number identified in the subscriber's response, and then exits.

In state 320, the system determines whether the selected option is to pass a message to the caller. If not, the illustrated method continues to state 326. Otherwise, in state 322 a message may be recorded by the subscriber, converted from text to speech, retrieved from storage, etc. The message is then played for the caller in state 324, after which the illustrated procedure ends.

In state 326, the system determines whether the selected option is to take a voicemail message. If not, the procedure may exit if an unknown option was selected or may take other action as necessary to satisfy another selection not addressed here.

In state 328, the system determines whether the subscriber wishes to screen the voicemail message as it is recorded. If not, the illustrated procedure advances to state 332. Otherwise, in state 330 the call control system establishes an audio (e.g., voice over IP) connection with the subscriber's device and interconnects the caller and the necessary voicemail module. In state 332, the voicemail module records the caller's message and, if call screening was selected, the message is simultaneously passed to the subscriber's device and played for the subscriber. If the subscriber is screening the voicemail message and chooses to pick up the call, in optional state 334 audio input from the subscriber is enabled and the voicemail module may stop recording. After state 334 the illustrated procedure ends.

The foregoing descriptions of embodiments of the invention have been presented for purposes of illustration and description only. They are not intended to be exhaustive or to limit the invention to the forms disclosed. Many modifications and variations will be apparent to practitioners skilled in the art. Accordingly, the above disclosure is not intended to limit the invention; the scope of the invention is defined by the appended claims.

What is claimed is:

1. A method of controlling a telephone call to an instant messaging user, comprising the steps of:
   (a) receiving at a call server a call directed to the user;
   (b) identifying an instant messaging service used by the user;
   (c) sending an instant message to the user through the instant messaging service to offer the user one or more options for responding to the call, wherein said options are based on a profile of the user;
   (d) if no response is received from the user within a predetermined period of time, controlling the call as specified in a default option; and
   otherwise:
   (e) receiving an option selection from the user over the instant messaging service; and
   (f) controlling the call as specified in said selected option;
   wherein when the user selects an option to answer the call over the instant messaging service, the controlling step further comprises the steps of:
   (f1) if the instant messaging service is communicatively coupled to both a microphone and a speaker at the user's side, establishing an audio connection between the user and the caller;
   (f2) if the instant messaging service is not communicatively coupled to a speaker at the users side, establishing verbal-textual communication between the caller and the user by enabling speech-to-text software conversion; and
   (f3) if the instant messaging service is not communicatively coupled to both a microphone and a speaker at the user's side, establishing verbal-textual communication between the caller and the user by enabling speech-to-text and/or text-to-speech software conversion.

2. The method of claim 1, further comprising determining a user name of the user for the instant messaging service.

3. The method of claim 1, wherein said one or more options include one or more of the set of: transfer the call, answer the call, take a message from the caller and play a message for the caller.

4. The method of claim 1, wherein said selected option is presented in said instant message as a hyperlink and said receiving said option selection comprises receiving a communication connection initiated by the user's selection of said selected option.

5. The method of claim 1, wherein said selected option is to play a message for the caller, the method further comprising recording a message from the user.

6. The method of claim 1, wherein said selected option is to play a message for the caller and said controlling comprises:
   converting a textual message provided by the user into audio; and
   playing said converted message for the caller.

7. The method of claim 1, wherein the step (f1) further comprises the steps of:
   establishing an audio connection between the user and said call server; and
   bridging the call onto said audio connection.

8. The method of claim 1, wherein said audio connection between the user and the caller is established through the instant messaging service without further action by either the caller or the user.

9. A method of handling a telephone call for a subscriber, comprising the steps of:
   (a) receiving at a call server a call for a subscriber;
   (b) identifying a first computer-implemented instant messaging system used by the subscriber;
   (c) sending a first instant message to the subscriber through the instant messaging system, wherein said first instant message includes a first set of options for handling the call, wherein said first set of options are based on a subscriber profile of the subscriber, and one or more of said first set of call handling options comprise links to said call server;
   if the subscriber selects one of said first set of call handling options:
   (d) receiving a communication connection from the subscriber, wherein said connection is initiated by the subscriber's selection of a call handling option that comprises a link; and
   (e) handling the call as specified in said selected call handling option;
   wherein when the subscriber selects an option to answer the call over the instant messaging service, the controlling step further comprises the steps of:
      (e1) if the instant messaging service is communicatively coupled to both a microphone and a speaker at the subscriber's side, establishing an audio connection between the subscriber and the caller; and
      (e2) if the instant messaging service is not communicatively coupled to both a microphone and a speaker at the subscriber's side, establishing verbal-textual communication between the caller and the subscriber by using speech-to-text software conversion.

10. The method of claim 9, further comprising:
    if the subscriber does not respond to said first instant message within a predetermined period of time, handling the call as specified in a default call handling option.

11. The method of claim 9, further comprising:
    identifying the user by an original called number field of the call.

12. The method of claim 9, further comprising:
    identifying the caller by a caller identification field of the call;
    wherein said first instant message includes an identifier of the caller.

13. The method of claim 9, wherein said links are hyperlinks to said call server.

14. The method of claim 9, wherein said receiving a call comprises receiving a call forwarded to said call server from a subscriber number originally dialed by the caller.

15. The method of claim 9, further comprising retrieving user names of the subscriber for one or more instant messaging systems.

16. The method of claim 9, further comprising sending a second instant message to the subscriber through an instant messaging system different from said first instant messaging system, wherein said second instant message comprises a second set of call handling options.

17. The method of claim 16, further comprising:
    if the subscriber selects one of said second set of call handling options:
    receiving a return instant message from the subscriber, wherein said return instant message includes an identifier of a call handling option selected by the subscriber; and
    handling the call as specified in said selected call handling option.

18. The method of claim 9, wherein said selected call handling option comprises transferring the call and said handling the call comprises:
    transferring the call from said call server to a telephone number identified by the subscriber.

19. The method of claim 9, wherein said selected call handling option comprises playing a message for the caller and said handling the call comprises:
    playing a message identified by the subscriber for the caller.

20. The method of claim 19, further comprising converting said identified message from text to audio prior to said playing.

21. The method of claim 19, further comprising recording said message prior to said playing.

22. The method of claim 9, wherein step (e1) further comprises the steps of:
    establishing an audio connection between said call server and the subscriber, without further action on the part of the caller; and
    bridging the call onto said audio connection.

23. The method of claim 22, wherein said establishing an audio connection comprises establishing an audio connection between said call server and a communication device on which the subscriber received said first instant message.

24. The method of claim 9, wherein said selected call handling option comprises taking a voicemail message from the caller and said handling the call comprises:
    connecting the call to a voice recording module; and
    recording a message from the caller.

25. The method of claim 24, wherein the subscriber chooses to screen said voicemail message, the method further comprising
    establishing an audio connection between said call server and the subscriber; and
    bridging said audio connection onto said voice recording connection.

26. A computer readable storage medium storing instructions that, when executed by a computer, cause the computer to perform a method of controlling a telephone call to an instant messaging user, the method comprising the steps of:
    (a) receiving at a call server a call directed to the user;
    (b) identifying an instant messaging service used by the user;
    (c) sending an instant message to the user through the instant messaging service to offer the user one or more options for responding to the call, wherein said options are based on a profile of the user;

(d) if no response is received from the user within a predetermined period of time, controlling the call as specified in a default option; and otherwise:

(e) receiving an option selection from the user; and (f) controlling the call as specified in said selected option;

wherein when the user selects an option to answer the call over the instant messaging service, the controlling step further comprises the steps of:

(f1) if the instant messaging service is communicatively coupled to both a microphone and a speaker at the user's side, establishing an audio connection between the user and the caller; and (f2) if the instant messaging service is not communicatively coupled to both a microphone and a speaker at the user's side, establishing verbal-textual communication between the caller and the user by using speech-to-text software conversion.

27. The method of claim 9, wherein said step of establishing verbal-textual communication between the subscriber and the caller further comprises use of text-to-speech conversion software.

28. The computer readable storage medium of claim 26, wherein said step of establishing verbal-textual communication between the caller and the user further comprises use of text-to-speech software conversion.

\* \* \* \* \*